United States Patent [19]

Deck

[11] Patent Number: 5,208,451
[45] Date of Patent: May 4, 1993

[54] METHOD AND APPARATUS FOR AUTOMATED FOCUSING OF AN INTERFEROMETRIC OPTICAL SYSTEM

[75] Inventor: Leslie L. Deck, Middletown, Conn.

[73] Assignee: Zygo Corporation, Middlefield, Conn.

[21] Appl. No.: 878,447

[22] Filed: May 4, 1992

[51] Int. Cl.$^5$ ............................................. G01J 1/20
[52] U.S. Cl. .................................. 250/201.3; 356/356
[58] Field of Search ...................... 250/201.3, 216, 550, 250/201.6; 356/356, 345

[56] References Cited

U.S. PATENT DOCUMENTS

| | | | |
|---|---|---|---|
| 4,803,352 | 2/1989 | Bierleutgeb | 250/201.3 |
| 4,931,630 | 6/1990 | Cohen et al. | 250/201.3 |
| 5,122,648 | 6/1992 | Cohen et al. | 250/201.3 |

Primary Examiner—David C. Nelms
Assistant Examiner—K. Shami
Attorney, Agent, or Firm—Cohen, Pontani, Lieberman, Pavane

[57] ABSTRACT

A method and apparatus for removing the deleterious effects of interference on the focus error signal when focusing interferometric optical systems using triangulation or astigmatic techniques. These interference effects are eliminated by using the phase relationship between the differential error signal and the total intensity of the beam incident on the differential detector to identify and recover a unique focus position of a surface under test.

38 Claims, 10 Drawing Sheets

METHOD AND APPARATUS FOR AUTOMATED FOCUSING OF AN INTERFEROMETRIC OPTICAL SYSTEM

FIELD OF THE INVENTION

The present invention relates generally to precision metrology instrumentation and, in particular, to methods and apparatus for automated focusing of an optical system such, for example, as an interferometric microscope.

BACKGROUND OF THE INVENTION

Interferometric microscopes are used extensively in the metrology and quantitative characterization of surfaces. Such devices are non-contact instruments of extraordinary precision having typical vertical solutions of about or in excess of 1 Å. In an interference microscope, an interferometer is typically mounted at the downstream end of or following the microscope objective. There, light—most commonly collimated light from a laser or the like—from the source is split by a beamsplitter into a reference beam and a measurement beam. The two beams travel different paths to the reference and measurement (or test) surfaces, respectively, from which they are reflected back and then recombined at the beamsplitter. The resulting interference pattern is used to extract the relative differences in path length of the two beam paths using well known interferometric techniques. If the reference surface features are known, these path differences can be correlated to the height of surface features on the measurement or test surface, thus providing the user with a three-dimensional perspective or mapping of the measurement surface. See, for example, J. F. Biegen et al., "High-Resolution Phase-Measuring Laser Interferometric Microscope for Engineering Surface Metrology", 1 Surface Topography 469 (1988). However, accurate data can only be obtainable when the measurement surface is in focus.

Accurate focusing of an interferometric microscope using conventional microscope focusing techniques is, for a number of reasons, difficult at best. For example, some prior art methods utilize "texture algorithms", such as are disclosed in U.S. Pat. Nos. 4,600,832 (Grund), 4,577,095 (Watanabe), 4,447,717 (Nohda) and 4,333,007 (Langlais, et al.), to focus on discernible features of the measurement surface. Unfortunately many highly polished surfaces of the type generally measured in precision surface metrology are devoid of features large enough to accommodate the effective use of these techniques.

Another prior art focusing technique, disclosed in U.S. Pat. No. 4,931,603 (Cohen, et al.), relies on the known fact that interferometric microscopes using an equal path (MIRAU) objective exhibit maximum interference at focus. This technique accordingly searches for the extremely narrow interference region from a broadband white light source. However, the extreme narrowness of the interferences region, typically a few microns, makes systematic searching an unusually time-consuming task, even when relatively close to focus. Moreover, once the interference region is located it must still be mapped to determine the point of maximum interference contrast. Thus, this prior art technique has no true "capture range" or region in which the direction of test surface movement toward focus is known, leaving systematic searching for focus as the only viable alternative, Such searching is time consuming and greatly increases the likelihood of a collision through actual physical contact between the objective and target, raising the very real possibility that both may be damaged or destroyed.

Other prior art focusing techniques are based on optical triangulation principles and are commonly referred to as triangulation methods. These include, among others, the skew beam method and the Foucault knife edge method. See, for example, E. H. Hellen and D. Axelrod, "An Automatic Focus/Hold System for Optical Microscopes", 61 Rev. Sci. Instrum. 3722 (1990). The use of similar techniques in conventional microscopes is also disclosed in U.S. Pat. Nos. 4,687,913 (Chaben), 3,798,449 (Reinheimer, et al.), 4,661,692 (Kawasaki) and 4,625,103 (Kitamura, et al.). In these methods, a peripheral ray is reflected from the test surface and is then focused at an image plane. As the test surface moves, the longitudinal focus shift of the image is translated into a lateral motion of the ray across the face of a differential detector located at the image plane, and a focus error signal is generated by the autofocus detector. These methods enjoy high precision, a large capture range, high-speed responsiveness suitable for fast servo control, and simple architecture. Unfortunately, when used in conjunction with an interferometric microscope, the presence of interference produces modulation in the focus error signal and creates multiple zero crossings which are indistinguishable from the single zero crossing that identifies true focus, thus preventing a unique determination of focus. All triangulation methods suffer from this effect when used in interferometric optical systems.

Still another prior art focusing technique is the astigmatic lens method. See, for example, D. Cohen et al., "Automatic Focus Control: the Astigmatic Lens Approach", 23 Applied Optics 565 (1984). In this method, a point source is reflected off the object plane and is refocused at the image place using an astigmatic lens. If a quadrant detector, whose lines dividing the sensing quadrants lie at 45 degrees to the orientation of the astigmatic focal lines, is located at the image plane, a focus error signal similar to that produced by triangulation methods can be obtained. Unfortunately, the astigmatic lens method also suffers from interference effects in precisely the same manner as do triangulation methods.

There is accordingly an unsatisfied need, particularly for use in or in association with interferometric microscopes and the like, for an automatic focusing apparatus and technique that is fast and repeatable with a broad capture range, and that can be utilized for quantitative characterization of the types of surfaces typically encountered or of interest in precision surface metrology.

OBJECTS OF THE INVENTION

It is accordingly the desideratum of the present invention to provide a method and apparatus for automated focusing, with speed and precision, of optical systems. It is a particular object of the invention to provide such a method and apparatus that are suitable for use with interferometric optical systems for quantitative characterization and mapping of test surfaces.

It is a further object of the invention to provide such a method and apparatus that may be used in or in association with an interferometric microscope.

It is another object of the invention to provide such a method and apparatus that provides an automated indication of the direction of test surface movement toward focus so as to facilitate automated determinations of focus.

A still further object of the invention is to provide such a method and apparatus that provides a large capture range so that the direction of focus is determinable even when relatively far from focus, thereby enabling enhanced ease of both manual focusing and automated decision making and reducing the possibility of a catastrophic collision between the objective and test surface in an interference microscope.

SUMMARY OF THE INVENTION

The present invention accordingly provides a method and apparatus for precisely focusing an optical system on a test surface in the presence of optical interference. An apparatus constructed in accordance with the invention and carrying out the method thereof may, by way of example, include a triangulation or astigmatic lens type autofocus apparatus having means for producing a first signal indicative of the total intensity of an autofocus beam impinging on a detector; means for producing a second signal indicative of the position or distribution of the impinging beam relative to the detector's electro-optical center; means, as for example a zero-crossing detector on the AC-coupled first signal, for determining the instant in time when a first point occurs in each interference cycle; means, as for example a zero-crossing detector on the AC-coupled first signal, for determining the instant in time when a second point, 180 degrees out of phase with the first point, occurs in each interference cycle; means for adding samples of the second signal taken at the first and second points in each interference cycle to produce a focus error signal; and means for determining, from the focus error signal, the direction of axial translation of the test surface necessary to bring the test surface into focus. An apparatus in accordance with the invention may further include means, as for example a CCD (i.e. charge coupled device) camera, for displaying the lateral location on the test surface at which focus is being determined; means for controlling the axial motion and position of the optical system relative to the test surface as a function of the state of the focus error signal; and means for moving the optical system relative to the test surface.

Other objects and features of the present invention will become apparent from the following detailed description, considered in conjunction with the accompanying drawings. It should be understood, however, that the drawings are designed solely for purposes of illustration and not as a definition of the limits of the invention, for which reference should be made to the appended claims.

DETAILED DESCRIPTION OF THE DRAWINGS

In the drawings, wherein like reference characters denote similar elements throughout the several views.

DETAILED DESCRIPTION OF THE PREFERRED EMBODIMENTS

The present invention is directed to the use of triangulation and astigmatic autofocusing techniques in an optical system and, most particularly (but not exclusively), an interferometric optical system. The invention is specifically described herein in the context of an interferometric microscope diagrammatically illustrated in FIG. 1, although those skilled in the art will nevertheless recognize the invention's broader applicability and utility to other and additional devices and end uses, and such alternate uses should be understood as being within the fully intended scope and contemplation of the invention.

Figure 1:
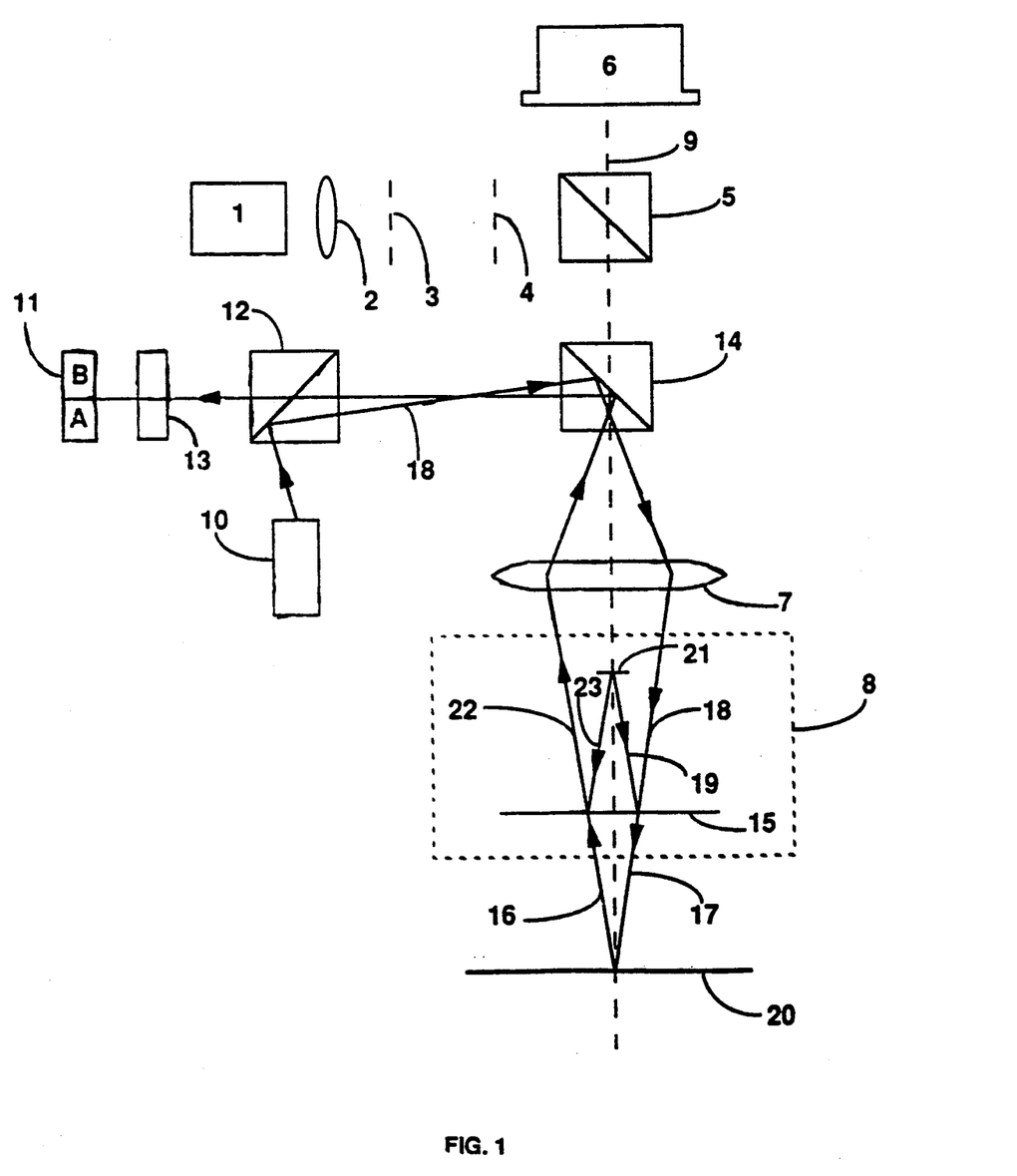
FIG. 1 diagrammatically depicts an interferometric microscope constructed in accordance with and incorporating the present invention.

The interferometric microscope optical system shown in FIG. 1 incorporates the usual optical elements disposed for directing a beam of collimated light along an optical axis. These elements include a light source 1, a condenser or collector lens 2, an aperture stop 3, a field stop 4, a beamsplitter 5, a CCD or other suitable type of camera 6, an objective 7, and an interferometer 8, all of which are well known in the art and, accordingly, may be selected and implemented in any suitable manner as a general matter of design choice.

The autofocus technique of the present invention may be practiced using either a triangulation or an astigmatic lens focusing method. In this description of a presently preferred method and apparatus of the invention, the skew beam method will be employed, albeit solely by way of illustration and example; other focusing methods and techniques may, of course, be substituted in accordance with the invention. FIG. 1 depicts the principal components of an apparatus constructed in accordance with the invention and incorporated into an interferometric microscope.

With particular reference to FIG. 1, an autofocus light source 10 emits or otherwise provides a peripheral ray 18. Although a separate autofocus light source 18 is provided in the FIG. 1 microscope, it is intended and anticipated that the source 1 may alternatively be the source of both the peripheral ray 18 and the main or primary collimated ray that is directed, through the condenser lens 2 and aperture and field stops 4, to the beamsplitter 5. In any event, the wavelength of the peripheral ray 18 from the autofocus source 10 is preferably selected so as to closely match that of the light from the source 1 and thereby reduce wavelength-dependent focus shift effects in the objective 7.

The peripheral ray 18 is first reflected by a beamsplitter 12 that isolates the source 10 from the autofocus detector 11. Another beamsplitter 14 redirects the ray 18 into the optical axis 9 of the interferometric microscope instrument, along which axis the primary light from the source 1 is also directed by the beamsplitter 5. The peripheral ray 18 propagates through one-half of the entrance pupil of the objective lens 7 and then through the interferometer 8 at which it is divided, by still another beamsplitter 15, into a test ray 17 and a reference ray 19.

The test ray 17 proceeds through the beamsplitter 15 to illuminate the test or measurement surface 20 which, in turn, reflects a portion of the incident test ray. The reflected test ray 16 travels back to the beamsplitter at which, as hereinafter described, it interferes with a reflected reference ray 23, thereby creating an interference ray 22 that proceeds through the objective 7 and on to the beamsplitter 14. The beamsplitter 14 reflects and redirects the interference ray 22 so that it thereafter passes through the beamsplitter 12 and then through a bandpass filter 13 which focusses the ray 22 onto the autofocus detector 11. In the disclosed interferometric microscope of FIG. 1, the autofocus detector 11 is implemented as a conventional bicell of known construction in which the two halves of the cell are delineated by the identifying numerals "A" and "B"; nevertheless other devices, such for example as a lateral effect photodiode or linear array, could alternatively be employed.

The reference ray 19 from the beamsplitter 15 is reflected onto a reference surface 21 from which the ray 19 is again reflected. The resulting reflected reference ray 23 impinges the beamsplitter 15 at the same location as, and thus interferes with, the incident reflected test ray 16 to form the interference ray 22 that, as described hereinabove, travels back to the autofocus detector 11 by way of the objective lens 7, the beamsplitters 14 and 12, and the bandpass filter 13.

Since the reference surface 21 is positionally fixed relative to the autofocus detector 11, and further because the autofocus detector 11 is located at the back focus of the objective 7, the reference ray 19—i.e. that part of the interference ray 22 attributable to the reference ray 19—is always in focus at the autofocus detector 11. Furthermore, the autofocus detector 11 is positioned so that the reference ray spot at the detector 11 straddles the gap between the two halves A, B of the bicell so as to produce an equal intensity illumination on each half. On the other hand, the test ray 17—i.e. the part of the interference ray 22 attributable to the test ray 17—produces a substantially hemispherical blur that impinges primarily on one cell when the test surface 20 is on one side of focus, sharpens to a focused spot that overlaps the reference spot when at focus, and broadens out to a hemispherical blur on the other or opposite cell when the test surface 20 is on the other side of focus.

It should also be pointed out that some of the radiation reflected from the reference surface 21 and test surface 20 passes, substantially undeflected, through the beamsplitter 14 to impinge on the camera 6. The illuminated spot thus created on the camera advantageously permits the user to selectively and adjustably position the test surface 20 so as to focus on any desired location on the test surface.

Figure 2A:
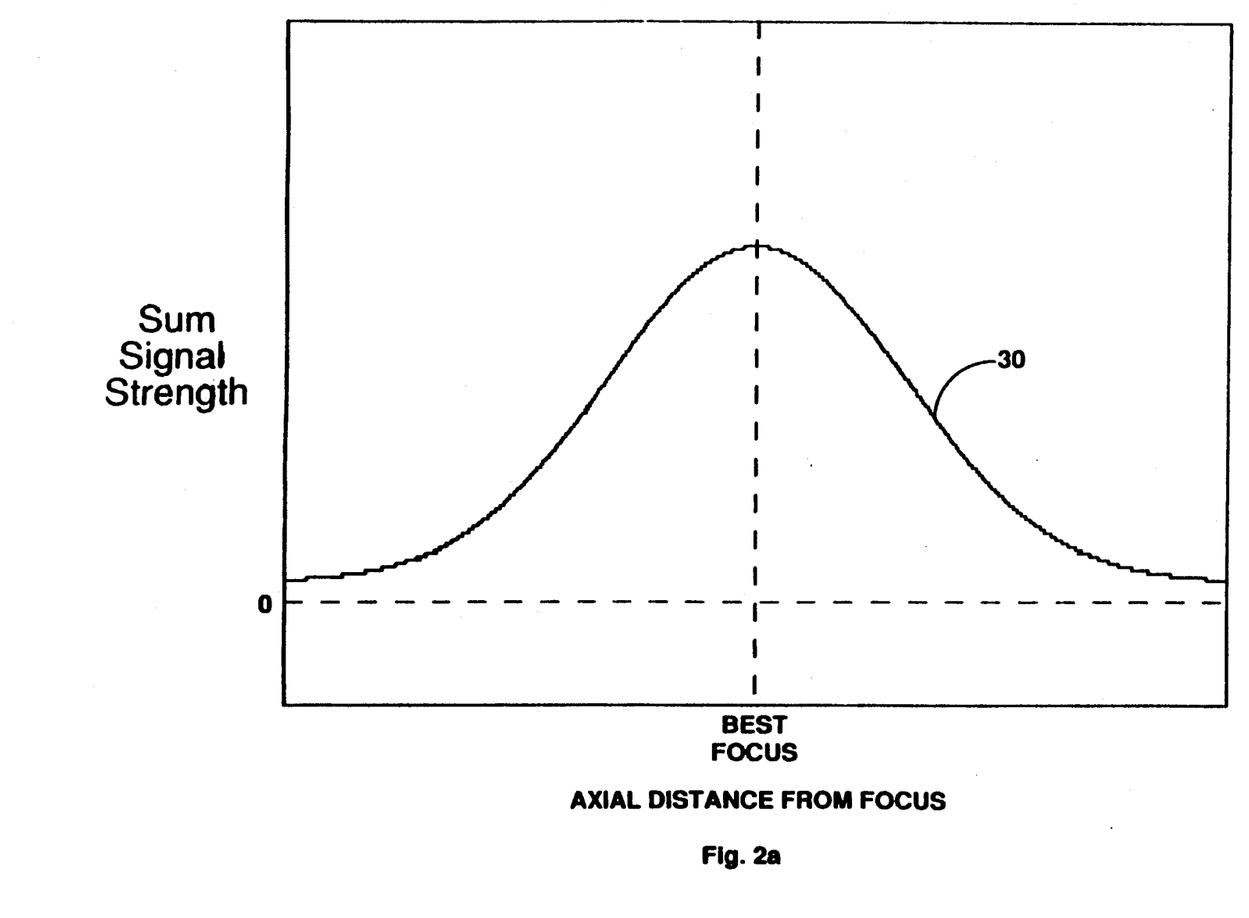
FIG. 2A graphically shows a typical characteristic SUM signal obtained when traversing through focus with a non-interferometric optical system.
Figure 2B:
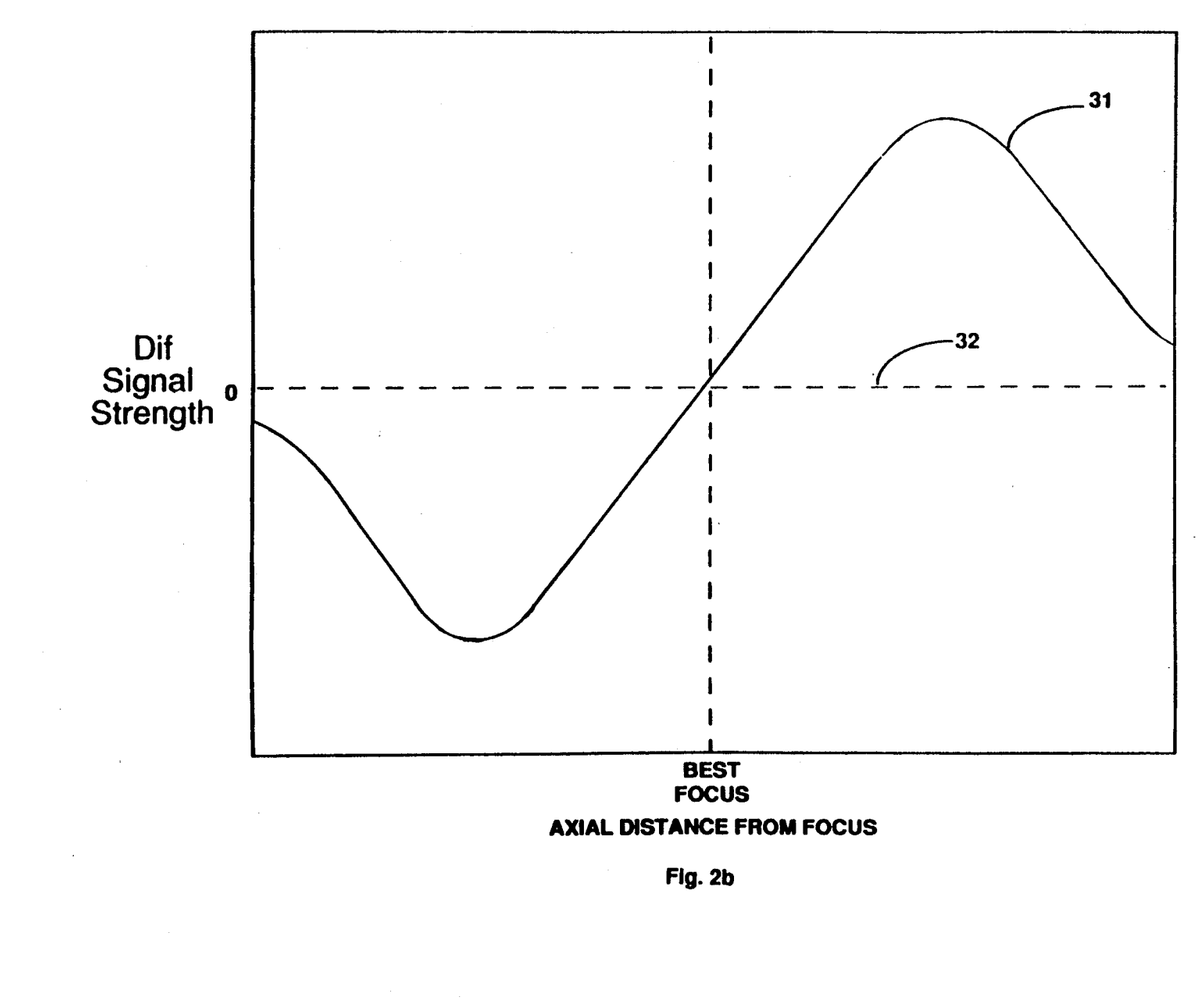
FIG. 2B graphically shows a typical characteristic DIF signal obtained when traversing through focus with a non-interferometric optical system.

Graphically depicted in FIGS. 2A and 2B are various signal amplitudes generated from or by the cells A, B of a bicell autofocus detector as a function of distance from focus in a non-interferometric optical system. FIG. 2A illustrates the SUM signal 30, defined as the sum of the outputs of the autofocus detector cells A, B (i.e., A+B), and therefore representing the intensity of the rays impinging on the detector. FIG. 2B illustrates the DIF signal 31, defined as the difference of the cell outputs (i.e., A−B) and, accordingly, representing the distributive position, relative to the electro-optical center of the detector, of the beam or rays impinging on the detector. In the absence of interference, the DIF signal 31 follows a characteristic "S" curve as one sweeps through focus. When relatively far from focus, the DIF signal weakens because much or most of the blurred spot intensity lies outside of the active area of the autofocus detector 11. Accordingly, the SUM signal 30 is utilized to determine when the DIF signal 31 is valid by providing a measure of the total amount of light energy impinging on the autofocus detector cells.

In conventional applications of the skew beam method, the SUM and DIF signals are sometimes combined into a single normalized signal defined by $(A-B)/(A+B)$. That would not typically be done in this application because, depending upon the relative reflectivities of the reference surface 21 and test surface 20, the intensity of the SUM signal 30 can approach zero at a minimum of an interference cycle. Moreover, focus is determined by the point at which the DIF signal 31 crosses zero, i.e. the axis identified by the reference number 32 in the Figures.

Those skilled in the art will also appreciate that where the astigmatic lens method is instead employed, the differential (DIF) signal 31 is defined by the relation $(A-C)+(B-D)$, where A,B,C and D identify the outputs of the four quarters of a quadcell used as the autofocus detector. The SUM signal 30 is similarly obtained by the relation $A+B+C+D$.

Figure 3A:
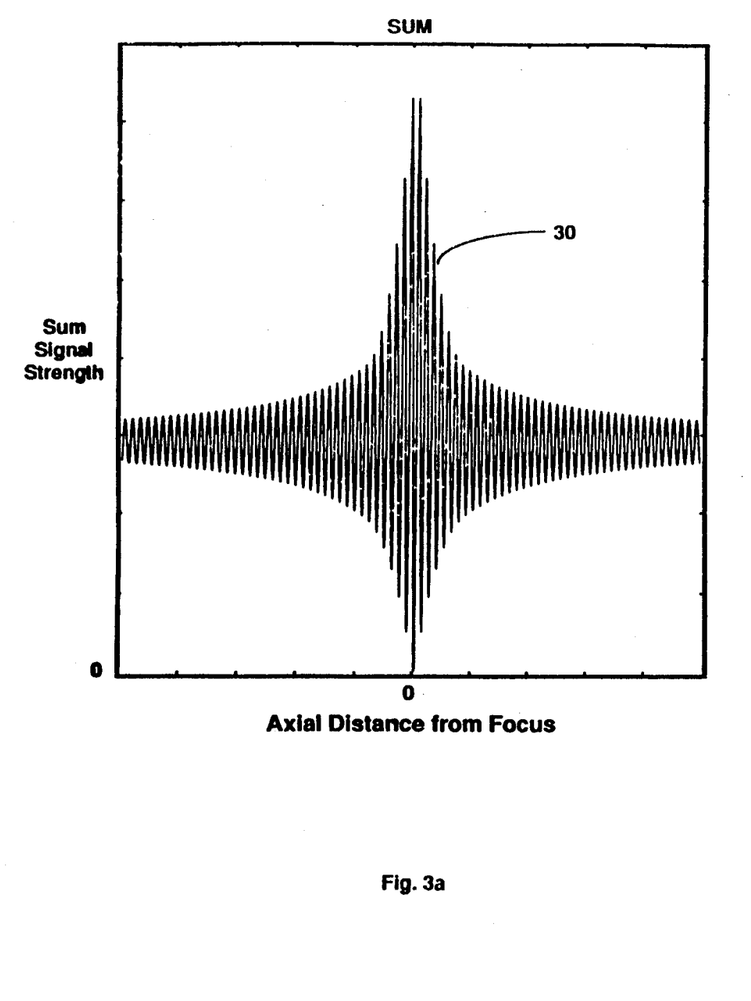
FIG. 3A graphically shows a typical characteristic SUM signal obtained when traversing through focus with an interferometric optical system.
Figure 3B:
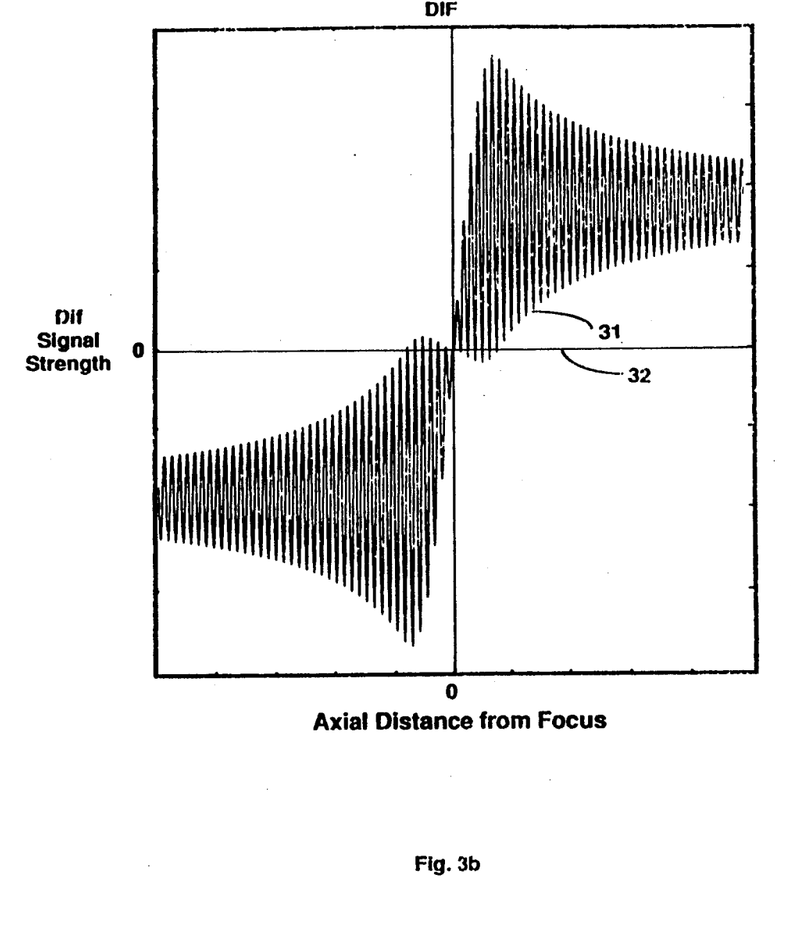
FIG. 3B graphically shows a typical characteristic DIF signal obtained when traversing through focus with an interferometric optical system.
Figure 3C:
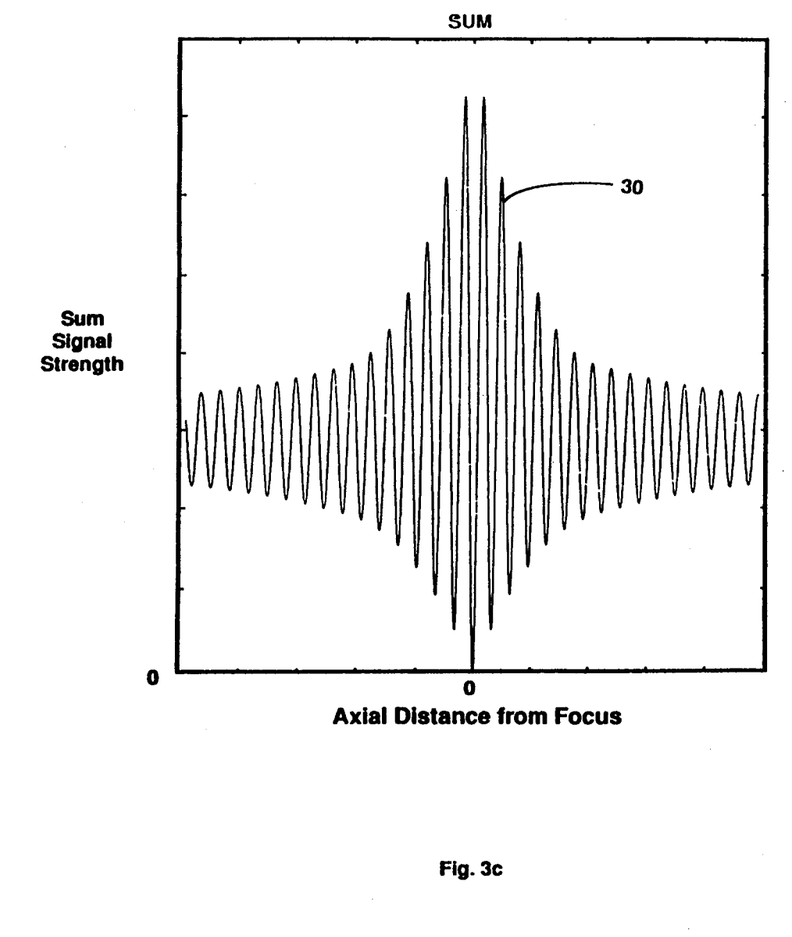
FIG. 3C is an enlarged view about the focus region of the SUM signal of FIG. 3A.
Figure 3D:
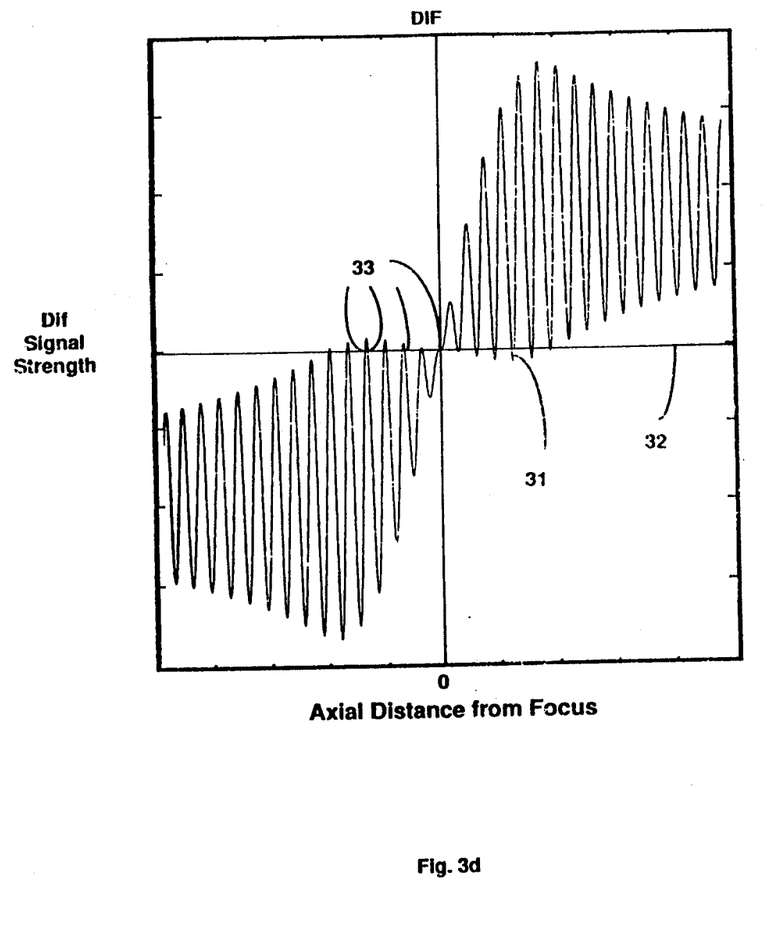
FIG. 3D is an enlarged view about the focus region of the DIF signal of FIG. 3B.
Figure 4:
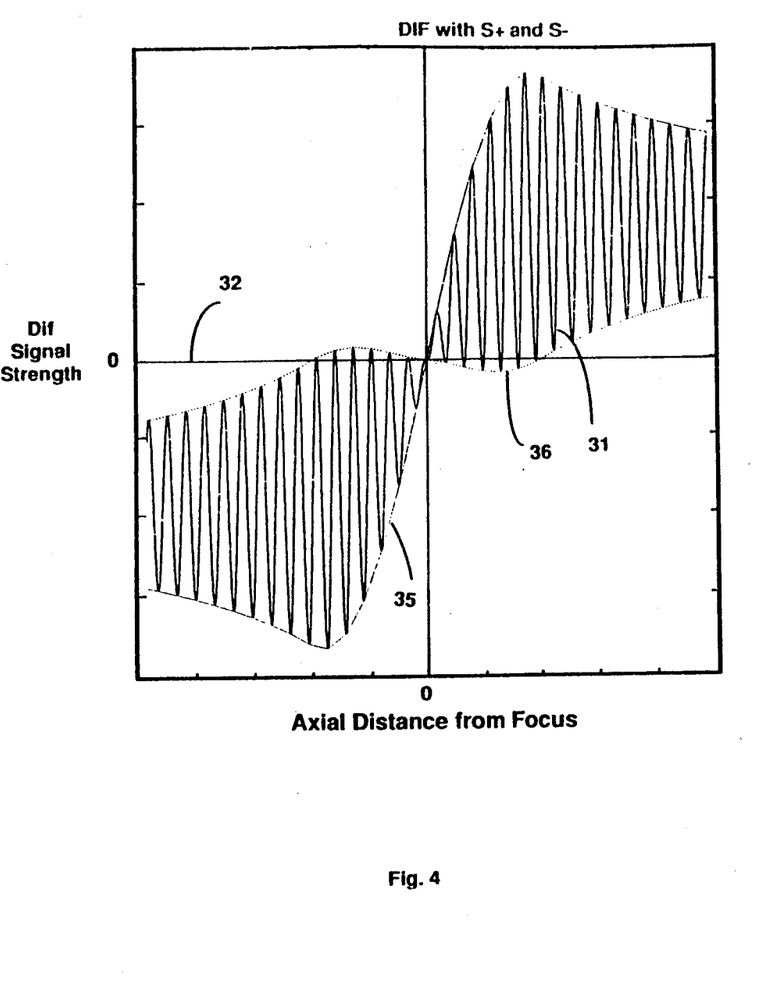
FIG. 4 graphically depicts the signals obtained by sampling the DIF signal of FIGS. 3B and 3D at the high-low extremes of the time-varying SUM signal during interference.

In an interferometric optical system, the amount of interference is proportional to the amount of overlap, at the autofocus detector 11, of the beams herein identified as the reflected reference ray 23 and reflected test ray 16. In an equal path interfeormetric system, moreover, this overlap is maximal at focus. The characteristic SUM and DIF signals 30, 31 in an interferometric system thus exhibit interference, as seen in FIGS. 3A, 3B; FIGS. 3C, 3D provide enlarged or closeup views of the interference proximate the point of focus for these signals. With particular reference to FIG. 3D, the 180-degree phase shift (from positive to negative) of the DIF signal 31 as the test surface (20) traverses focus is very important. The presence of multiple zero-axis crossings, resulting from interference, makes it very difficult to determine which of those crossing identifies true focus. In order to recover the single unique, focus-identifying zero crossing, the present invention relies upon a characteristic of the SUM signal 30—namely that it does not exhibit a 180-degree phase shift about focus. Accordingly, in accordance with the invention the DIF signal 31 may be sampled once at the same point in each interference cycle of the SUM signal 30 to provide a new signal hereinafter referred to as the focus error signal 35. This is graphically depicted in FIG. 4 wherein the focus error signal 35 has been generated by sampling the DIF signal 31 at the peaks of the SUM signal 30. Also shown in FIG. 4 is a related signal 36 obtained by sampling the DIF signal 31 at the troughs of the SUM signal 30.

Figure 5:
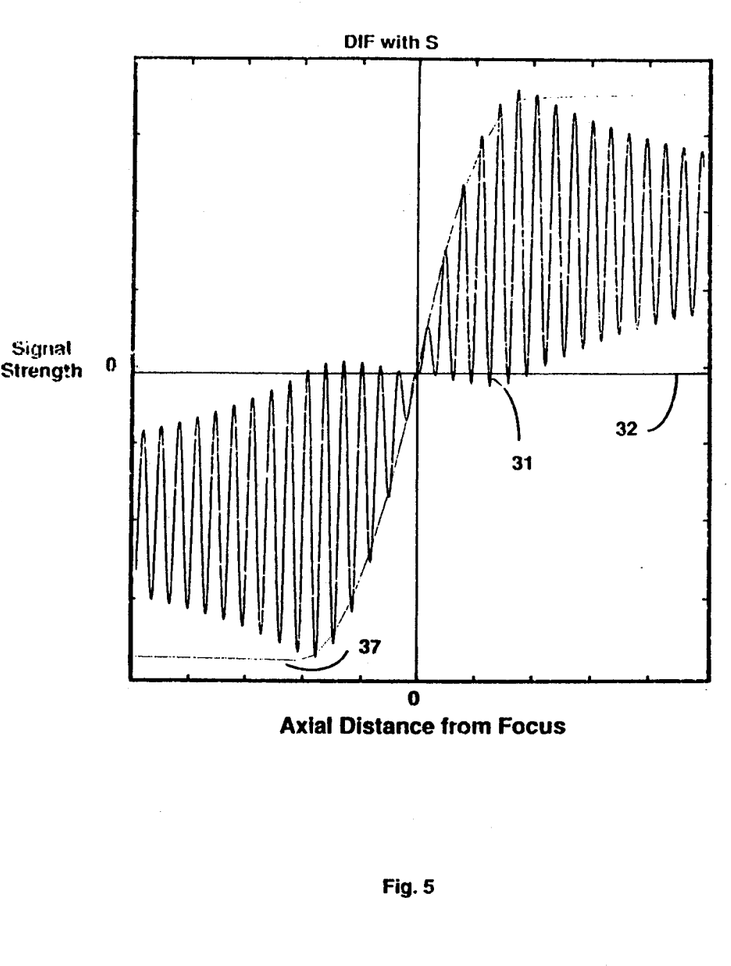
FIG. 5 graphically depicts the signal obtained by sampling the DIF signal of FIGS. 3B and 3D at two in-phase, 180° -separated points of the SUM signal during interference.

The sensitivity of the focusing system is determined by the slope, at focus, of the focus error signal 35. In order to maximize sensitivity when taking only one sample per interference cycle, sampling should occur when the DIF signal is at an extremum. In practice, the ability to do so is dependent on the nature of the reference and test surface materials and the relative phase change on reflection between them. If the phase change on reflection difference between the reference and test surfaces 21, 20 is zero—as would be the case where they are formed of the same material—then the reflected test and reference rays 16, 23 are in phase and the extremum of the DIF signal 31 will correspond to the extremum of the SUM signal 30. In this idealized case, the DIF signal should be sampled at the peaks of the SUM signal, as represented by the focus error signal tracing 35 in FIG. 4. If, on the other hand, the phase change on reflection from the reference and test surfaces is 180 degrees out of phase—as might be the case where one surface is a metal and the other is a dielectric—then the DIF signal 31 should be sampled at the troughs of the SUM signal 30, as represented by the signal tracing 36 in FIG. 4. In practice, however, the point for optimum sampling will generally be unknown. In the preferred practice of the invention, therefore, the focus error signal tracings obtained by sampling the DIF signal at two points of each interference cycle, separated by 180 degrees in phase, are added together, thereby making the resulting focus determination independent of the effects of phase change on reflection. This is illustrated in FIG. 5 which graphically depicts the focus error signal 37 generated by adding the signal tracings 35 and 36 in FIG. 4, which tracings were obtained by sampling the DIF signal 31 at the peaks and troughs, respectively, of the SUM signal 30.

Figure 6:
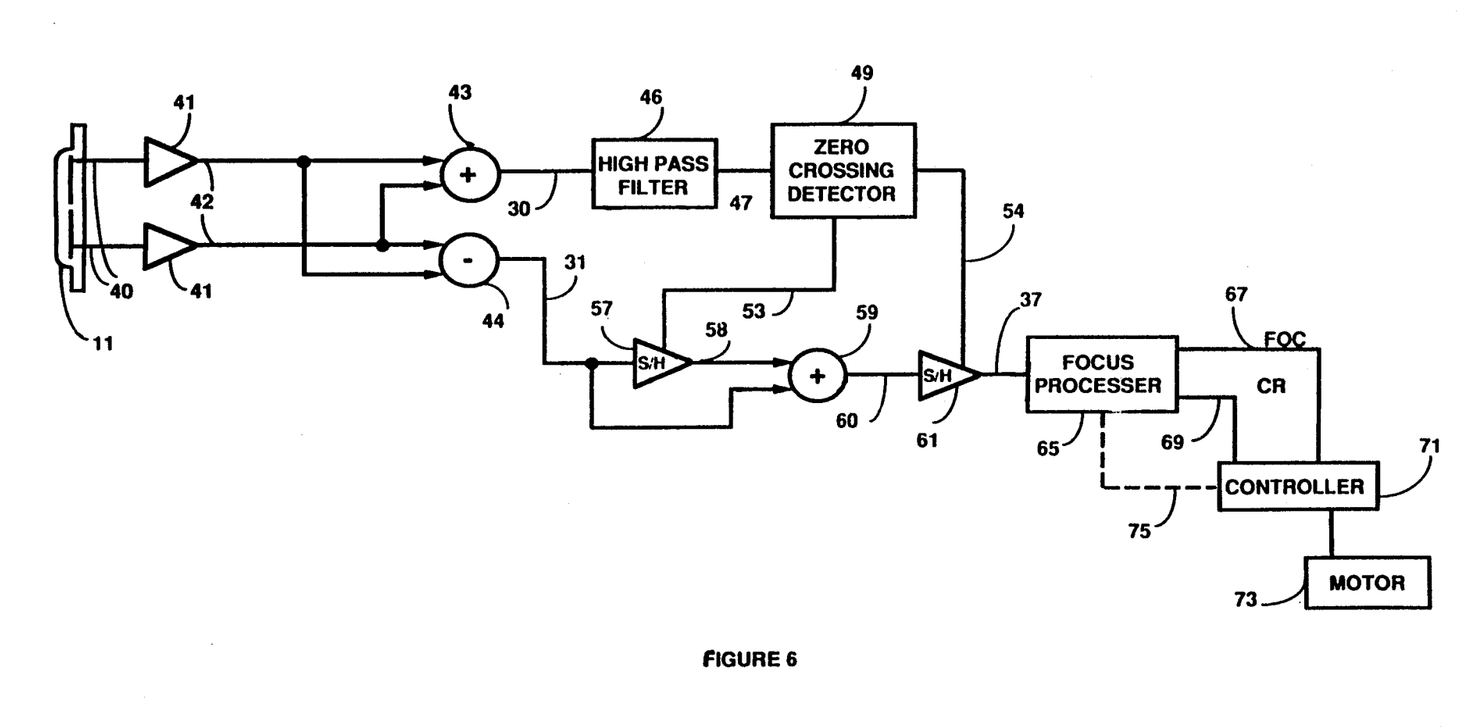
FIG. 6 is a diagrammatic block diagram representation of an electronic circuit for carrying out the skew beam method of automated focus determination in accordance with the present invention.

An electronic circuit block diagram for carrying out the automated focus function of the present invention as hereinabove described is illustrated in FIG. 6. Those skilled in the art will immediately recognize and appreciate that the circuit depicted in FIG. 6 is disclosed solely by way of example and represents only one of many suitable alternatives for implementing and carrying out the inventive apparatus and method. All such alternatives and variations should accordingly be considered to be within the intended scope and contemplation of the invention.

In any event, and with particular reference to FIG. 6, the two outputs 40 from the two halves or cells A, B of the autofocus detector 11 are input to respective transimpedence amplifiers 41 in which they are converted or translated or otherwise processed into suitable voltage signals 42. The SUM signal 30 and DIF signal 31 are then generated from the voltage signals 42 in a summing amplifier 43 and a difference amplifier 44, respectively. The SUM signal 30 is directed through a high-pass filter 46, and the output 47 of the filter 46 is fed to a zero-crossing detector (49) which is operable to provide, at its respective outputs, the two 180-degree separated points of each interference cycle as signals representing the time instants of the positive-going crossings 53 and the negative-going crossings 54. This functionality may, for example, be carried out using one or more comparators. The detector 49 also includes, or may have associated therewith, signal conditioning electronics that converts the zero crossing transitions into sample-triggering pulses of appropriate length for input to sample-and-hold (S/H) amplifiers 57, 59. Such conditioning may be performed using, by way of example, monostable multivibrators of the like. As an alternative to detection of the zero crossings of the SUM signal 30 in the detector 49, a positive and negative peak detector may be used to identify two 180-degree separated points of the waveform; in such an implementation the high pass filter 46 would not be required. It should also be noted that in the absence of interference, the zero-crossing detector is triggered by noise, thus providing frequent updates of the DIF signal 31 and permitting automated focusing determinations with non-interferometric objectives. As a still further alternative, the DIF signal 31 may be tracked, in the absence of interference, or sampled on a periodic basis using signals derived from, for example, a stage encoder.

With continuing reference now to FIG. 6, at the first (i.e. positive-going) zero crossing point of each SUM signal interference cycle the DIF signal 31 is sampled in a first sample and hold amplifier 57 to generate the signal 58. The signal 58 is then added, on a continuous basis, to the DIF signal 31 at an adder or summing amplifier 59 to provide the summed signal 60. At the second (i.e. negative-going) zero crossing point of each SUM signal interference cycle, the summed signal 60 is sampled in a second sample-and-hold amplifier 61 to create the focus error signal 37. The focus error signal 37 is then electronically processed, in the focus processor block 65, to produce two true/false signals shown as outputs 67, 69. The focus output 67, delineated FOC in FIG. 6, is true whenever the focus error signal 37 is positive, and is otherwise false. The capture range output 69, delineated CR in FIG. 6, is true whenever the focus error signal 37 is either above a predetermined positive threshold or below a predetermined negative threshold, and is otherwise false. The focus processor may, by way of example, be implemented utilizing comparators or the like. Thus the CR output 69 is used to define the capture range while the FOC output 67 provides identification of the focus point.

The manner in which the circuit of FIG. 6 is utilized to attain and identify focus in accordance with the present invention should now be readily apparent. When the autofocus sequence is begun, the state of the CR output 69 is examined. If the CR output is true, then the test surface 20 is already within the capture range and the direction of required movement of the test surface toward focus is identified by the sign of the focus error signal 37. The optical system is accordingly displaced relative to the test surface in the required direction until the FOC output 67 transitions—i.e. goes from positive to negative, or vice versa—at which point focus has been achieved. This functionality may, by way of example, be implemented by connecting the FOC and CR outputs 67, 69 (and, although not shown, the focus error signal 37) to an automated controller 71 for a motor 73 or piezoelectric transducer assembly or other suitable moving means for controlled axial translation of the optical system relative to the test surface. It should also be recognized that instead of connecting the FOC and CR outputs and the focus error signal to the motor controller 71, the processing logic for determining the required direction of relative axial movement of the test surface may be incorporated in or integrated with the focus processor 65, in which case an output 75 (shown in phantom in FIG. 6) instructing the specific relative axial translation of the test surface, if any, required to approach or achieve focus may alternatively be input to the controller 71. This latter approach is, indeed, preferred for an automated system, although such alternatives are considered to be mere matters of design choice.

Where, on the other hand, the CR output 69 is initially false, then the test surface 20 is beyond or outside of the capture range and the required direction of test surface movement toward focus is indeterminate. In that case, a systematic search can be carried out until the CR output 69 goes true, thereby confirming that the test surface has entered the capture range and permitting an automated determination of the required direction of relative movement of the test surface toward focus by examining the sign or state of the focus error signal 37.

Those skilled in the art will understand and appreciate that the method and apparatus of the invention can be implemented both for fully automated focus procedures and in semi-automated processes in which the relative translations or displacements of the test surface or optical system toward and into focus are carried out by or under the control of the user in accordance with the states and dynamic status of the focus error signal 37 and the FOC and CR signals 67, 69. Although it has been assumed in this disclosure that it is the optical system that is moved relative to the stationary test surface to achieve focus, as is most common, arrangements in which the test surface is itself moved axially along the optical path may alternatively be employed. It is also expected and anticipated that the invention be applied to numerous techniques and processes and in a wide variety of apparatus other than as specifically herein disclosed and described, as general matters of design choice.

Thus, while there have been shown and described and pointed out fundamental novel features of the invention as applied to preferred embodiments thereof, it will be understood that various omissions and substitutions and changes in the form and details of the devices illustrated and in their operation, and in the methods described, may be made by those skilled in the art without departing from the spirit of the invention. It is the intention, therefore, to be limited only as indicated by the scope of the claims appended hereto.

What is claimed is:

1. A method for automated focusing of an optical system on a test surface disposed for relative axial movement between the test surface and optical system in an interferometric apparatus in which a cyclically-varying interference beam impinges on a detector, comprising the steps of:

providing a first signal indicative of distributive position of the impinging interference beam relative to an electro-optical center of the detector;

determining a first time instant when a first point occurs in each cycle of the interference beam;

determining a second time instant when a second point, 180 degrees out of phase with said first point, occurs in each cycle of the interference beam;

sampling the first signal at each of said first and second time instants to provide a respective first and second sample of the first signal for each said cycle of the interference beam;

adding the first and second sample for each said cycle of the interference beam to provide a focus error signal;

determining a required direction of axial movement toward focus of the test sample relative to the optical system as a function of the focus error signal such that a positive state of the focus error signal relative to a predetermined value indicates required relative movement of the test surface in a first axial direction, a negative state of the focus error signal relative to said predetermined value indicates required relative movement of the test surface in a second axial direction opposite the first direction, and equality of the focus error signal with said predetermined value indicates that the test surface is in focus so that no relative movement of the test surface is required; and moving the test sample relative to the optical system in said required direction toward focus as indicated by the state of the focus error signal.

2. A method in accordance with claim 1, further comprising the step of providing a second signal indicative of intensity of the interference beam impinging on the detector; and wherein said first and second time points of each said cycle of the interference beam are determined from said second signal.

3. A method in accordance with claim 2, wherein said step of determining the first time instant further comprises determining the first time instant at a positive-going zero crossing of the second signal, and said step of determining the second time instant further comprises determining the second time instant at a negative-going zero crossing of the second signal.

4. A method in accordance with claim 3, wherein said predetermined value is zero.

5. A method in accordance with claim 1, wherein said predetermined value is zero.

6. A method in accordance with claim 1 wherein the detector is a bicell having two halves, said step of providing the first signal comprising generating the first signal by calculating the difference in intensity of the interference beam impinging on the two halves of the bicell detector.

7. A method in accordance with claim 2 wherein the detector is a bicell having two halves, said step of providing the second comprising generating the second signal by calculating the sum of the intensities of the interference beam impinging on the two halves of the bicell detector.

8. A method in accordance with claim 7, said step of providing the first signal comprising generating the first signal by calculating the difference in intensity of the interference beam impinging on the two halves of the bicell detector.

9. A method in accordance with claim 1 wherein the detector includes first and second sensing cells disposed on opposite sides of the electro-optical center of the detector, said step of providing the first signal comprising generating the first signal by calculating a difference in intensity of the interference beam impinging on the first and second cells of the detector.

10. A method in accordance with claim 2 wherein the detector includes first and second sensing cells disposed on opposite sides of the electro-optical center of the detector, said step of providing the second signal comprising generating the second signal by calculating the sum of the intensities of the interference beam impinging on the first and second cells of the detector.

11. A method in accordance with claim 10, said step of providing the first signal comprising generating the first signal by calculating a difference in intensity of the interference beam impinging on the first and second cells of the detector.

12. An interferometric apparatus for automated focusing of an optical system on a test surface disposed for relative axial movement between the test surface and optical system and having a detector upon which a cyclically-varying interference beam impinges, comprising:

means connected to the detector for providing a first signal indicative of distributive position of the impinging interference beam relative to an electro-optical center of the detector;

first means for determining a first time instant when a first point occurs in each cycle of the interference beam;

second means for determining a second time instant when a second point, 180 degrees out of phase with said first point, occurs in each cycle of the interference beam;

means for sampling the first signal at each of said first and second time instants to provide a respective first and second sample of the first signal for each said cycle of the interference beam;

means for adding the first and second sample for each said cycle of the interference beam to provide a focus error signal;

processing means for determining a required direction of axial movement toward focus of the test sample relative to the optical system as a function of the focus error signal such that a positive state of the focus error signal relative to a predetermined value indicates required relative movement of the test surface in a first axial direction, a negative state of the focus error signal relative to said predetermined value indicates required relative movement of the test surface in a second axial direction opposite the first direction, and equality of the focus error signal with said predetermined value indicates that the test surface is in focus so that no relative movement of the test surface is required; and means for axially moving the test sample relative to the optical system.

13. An apparatus in accordance with claim 12, further comprising means for controlling said moving means in accordance with an output of said processing means to axially move the test sample relative to the optical system in said required direction toward focus.

14. An apparatus in accordance with claim 12, further comprising means connected to the detector for providing a second signal indicative of intensity of the interference beam impinging on the detector, and wherein said first and second means receive said second signal for determining said first and second time points of each said cycle from said second signal.

15. An apparatus in accordance with claim 14, wherein said first means comprises means for determining said first time instant at a positive-going zero crossing of said second signal, and said second means comprises means for determining said second time instant at a negative-going zero crossing of said second signal.

16. An apparatus in accordance with claim 15, wherein said predetermined value is zero.

17. An apparatus in accordance with claim 12, wherein said predetermined value is zero.

18. An apparatus in accordance with claim 12 wherein the detector includes first and second beam sensing cells disposed on opposite sides of an electro-optical center of the detector, said means for providing the first signal comprising differential means for generating the first signal by calculating a difference in intensity of the interference beam impinging on the first and second cells of the detector.

19. An apparatus in accordance with claim 14 wherein the detector includes first and second beam sensing cells disposed on opposite sides of an electro-optical center of the detector, said means for providing the second signal comprising summing means for generating the first signal by calculating the sum of the intensities of the interference beam impinging on the first and second cells of the detector.

20. An apparatus in accordance with claim 19, wherein said means for providing the first signal comprising differential means for generating the first signal by calculating a difference in intensity of the interference beam impinging on the first and second cells of the detector.

21. An apparatus in accordance with claim 12, wherein said processing means comprises means for generating an FOC output that is true when said first signal is positive relative to said predetermined value and otherwise false, and for generating a CR output that is true when said first signal is either greater than a predetermined positive threshold or less than a predetermined negative threshold.

22. An apparatus in accordance with claim 21, wherein said predetermined value is zero.

23. An apparatus in accordance with claim 12, further comprising means for receiving and imaging the interference beam for indicating a position on the test surface at which automatic focussing is to be effected.

24. An apparatus in accordance with claim 23, wherein said receiving and imaging means comprises a charge coupled device camera.

25. A method for automated focusing of an optical system on a test surface disposed for relative axial movement between the test surface and optical system in an interferometric apparatus in which a cyclically-varying interference beam impinges on a detector, comprising the steps of:

providing a first signal indicative of distributive position of the impinging interference beam relative to an electro-optical center of the detector;

determining a first time instant when a first predetermined point occurs in each cycle of the interference beam;

sampling the first signal at each said first time instant to provide a first sample of the first signal for each said cycle of the interference beam, the plural first samples defining a focus error signal;

determining a required direction of axial movement toward focus of the test sample relative to the optical system as a function of the focus error signal such that a positive state of the focus error signal relative to a predetermined value indicates required relative movement of the test surface in a first axial direction, a negative state of the focus error signal relative to said predetermined value indicates required relative movement of the test surface in a second axial direction opposite the first direction, and equality of the focus error signal with said predetermined value indicates that the test surface is in focus so that no relative movement of the test surface is required; and moving the test sample relative to the optical system in said required direction toward focus as indicated by the state of the focus error signal.

26. A method in accordance with claim 25, wherein said first predetermined point comprises a peak of each said cycle.

27. A method in accordance with claim 25, wherein said first predetermined point comprises a trough of each said cycle.

28. A method in accordance with claim 26, wherein said predetermined value is zero.

29. A method in accordance with claim 27, wherein said predetermined value is zero.

30. A method in accordance with claim 25, wherein said predetermined value is zero.

31. A method in accordance with claim 25, further comprising the step of providing a second signal indicative of intensity of the interference beam impinging on the detector; and wherein said first time point of each said cycle of the interference beam is determined from said second signal.

32. A method in accordance with claim 25 wherein the detector is a bicell having two halves, said step of providing the first signal comprising generating the first signal by calculating the difference in intensity of the interference beam impinging on the two halves of the bicell detector.

33. A method in accordance with claim 31 wherein the detector is a bicell having two halves, said step of providing the second signal comprising generating the second signal by calculating the sum of the intensities of the interference beam impinging on the two halves of the bicell detector.

34. A method in accordance with claim 33, said step of providing the first signal comprising generating the first signal by calculating the difference in intensity of the interference beam impinging on the two halves of the bicell detector.

35. A method in accordance with claim 25 wherein the detector includes first and second sensing cells disposed on opposite sides of the electro-optical center of the detector, said step of providing the first signal comprising generating the first signal by calculating a difference in intensity of the interference beam impinging on the first and second cells of the detector.

36. A method in accordance with claim 31 wherein the detector includes first and second sensing cells disposed on opposite sides of the electro-optical center of the detector, said step of providing the second signal comprising generating the second by calculating the sum of the intensities of the interference beam impinging on the first and second cells of the detector.

37. A method in accordance with claim 36, said step of providing the first signal comprising generating the first signal by calculating a difference in intensity of the interference beam impinging on the first and second cells of the detector.

38. A method in accordance with claim 25, wherein said first predetermined point comprises one of a peak or a trough of each said cycle.

* * * * *